UNITED STATES PATENT OFFICE.

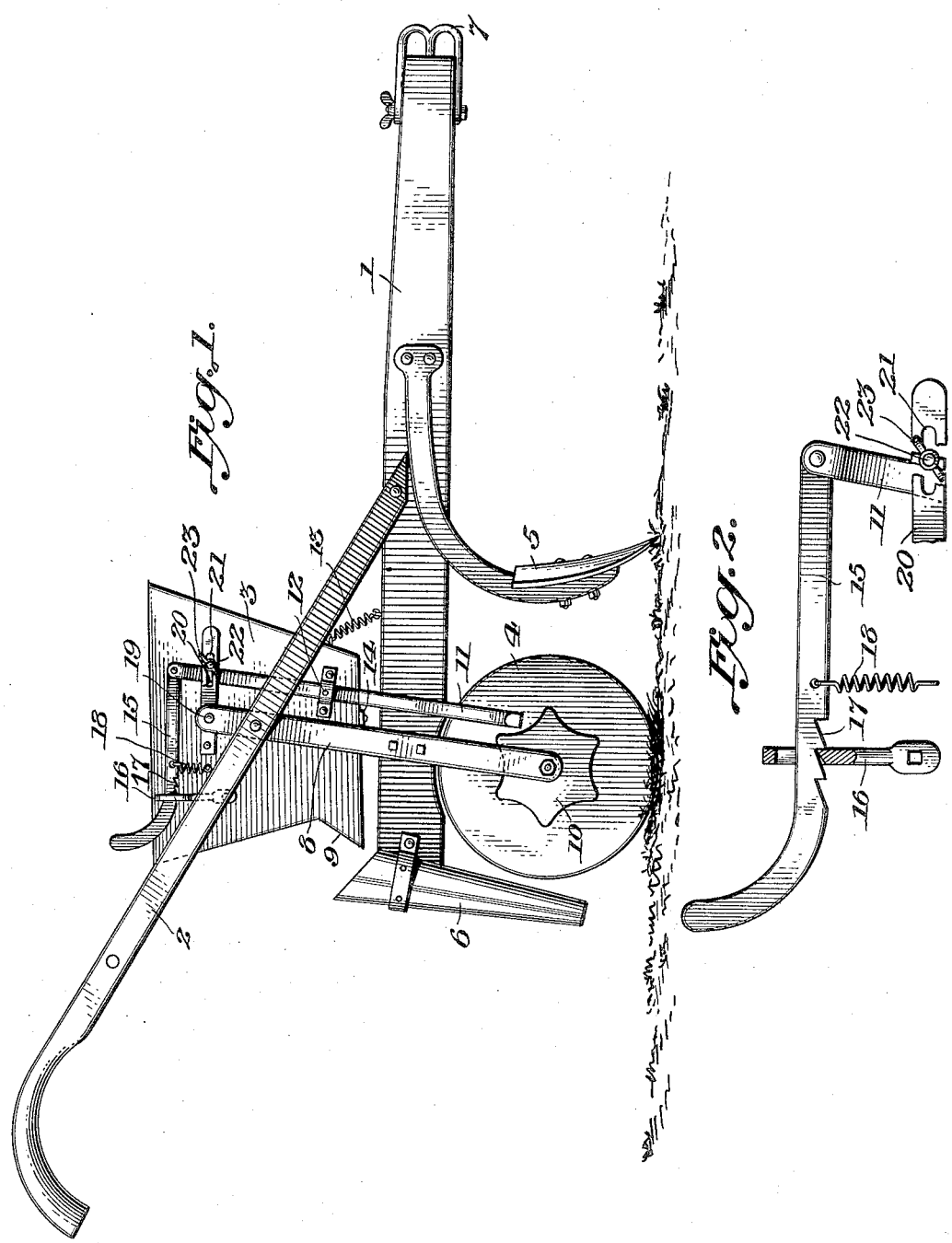

SIMEON R. SIKES, OF OCILLA, GEORGIA.

FERTILIZER-DISTRIBUTER.

1,074,902. Specification of Letters Patent. Patented Oct. 7, 1913.

Application filed July 14, 1913. Serial No. 778,956.

*To all whom it may concern:*

Be it known that I, SIMEON R. SIKES, a citizen of the United States, residing at Ocilla, in the county of Irwin and State of Georgia, have invented certain new and useful Improvements in Fertilizer-Distributers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in fertilizer distributers and analogous machines of that general type which comprises a wheeled hopper and connections actuated periodically by the ground wheel for controlling the discharge of material from the hopper.

The object of the invention is to provide an organization of extremely simple and inexpensive character for controlling the periodical discharge of the fertilizer or other material contained in the hopper and which has certain novel features of construction whereby the amount of material passed on each discharging operation may be regulated conveniently and with accuracy, and whereby the discharge of the material is effected in a certain and reliable manner.

Other objects and advantages will appear as the description proceeds.

An embodiment of the invention is illustrated in the accompanying drawings in which:

Figure 1 is a side elevation of a machine in which the features of the invention are incorporated. Fig. 2 is a detail view, partly in section, illustrating certain adjustably related elements of the connections for controlling the discharge of the material.

Similar characters of reference designate corresponding parts in both of the views.

In common with machines of the general type referred to, the machine disclosed includes a beam 1, handles 2, a hopper 3, a ground wheel 4, a plow blade 5, and a spout 6 for passing the material into the furrow formed by the blade 5. The beam has at its front end the usual clevis 7 or equivalent device for carrying the swingle tree.

In the embodiment disclosed the hopper is bodily movable, being pivotally hung at 19 between arms or uprights 8 secured to the beam 1. The hopper is provided at its rear end with a discharge mouth 9 which overhangs the spout 6 and the discharge of material through the mouth 9 is consequent to the jar or impact which is developed when the body movement of the hopper is suddenly arrested.

The discharge of material is initiated by the ground wheel 4 and the operative connections between the ground wheel and the hopper include essentially a star or spur wheel 10 which is arranged concentrically of the ground wheel and rotates therewith and an arm 11 which is carried by the hopper, depending therefrom and having its lower end formed for engagement by the teeth of the wheel 10. For the purpose of adjustment the arm 11 is pivotally connected to the hopper, as at 12, although during the normal operation of the machine a rigid relation obtains between said arm and said hopper.

When a projection on the wheel 10 engages the lower end of the arm 11 the hopper is rocked or tilted so that its mouth 9 moves downwardly. The return movement of the hopper is effected by a spring 13 having its ends connected to the front wall of the hopper and to the beam and is arrested by projections 14 which stand out from the sides of the hopper and engage the uprights 8. It will be apparent that the spring 13 effects a rapid return movement of the hopper and that the engagement of the projections 14 with the uprights 8 develops a substantial jar or impact by virtue of which a measured quantity of the material in the hopper will be discharged through the mouth 9. The quantity of the material discharged will depend upon the force or intensity of the shock which is developed by the engagement of the projections 14 with the upright 8 and such force or intensity may be regulated by regulating the throw of the hopper. For this purpose the arm 11 is adjusted to bring its lower end nearer to or farther from the projections of the wheel 10, the throw of the hopper being greater as the lower end of the arm 11 stands closer to the projections of the wheel 10.

The arm 11 carries at its upper end a pivoted handle 15 which projects rearwardly and passes through a slotted bracket 16 secured rigidly to the hopper. The underside of the handle 15 is formed with a series of rack teeth 17 which engage the bottom edge of the slot through which said handle projects, such engagement being maintained by a spring 18 having its ends connected to the handle and to the hopper. The adjustment of the arm 11 to the position desired is effected by a sliding movement of the handle 15 relatively to the hopper. For the purpose of such sliding movement the handle is first lifted to disengage its teeth 17 from the bracket 15 and when the arm 11 has been positioned as desired the handle is released, the spring 18 drawing it down and causing the engagement of one of its teeth with the bracket 16. In this way the arm 11 is locked in the position to which it has been set and is therefore held rigid with relation to the hopper. The throw of the hopper is increased by moving the handle 15 forwardly thereby bringing the lower end of the arm 11 nearer to the projections on the wheel 10; and is reduced by moving the handle 15 rearwardly, thereby bringing the lower end of the arm 11 farther from the projections on the wheel 10. If it is desired to wholly interrupt the operation of the hopper, this may be effected by moving the handle 15 rearwardly until the lower end of the arm 11 is out of the path of the projections of the wheel 10, thereby enabling said wheel to run free of said arm as is obvious.

It is convenient and preferable to extend the uprights 8 below the beam and to utilize the depending portions of said uprights as bearing for the shaft or axle upon which the ground wheel is mounted.

It will be apparent from the foregoing description that as the machine is drawn over the field, the hopper is vibrated more or less rapidly in accordance with the speed of movement of the machine and the number of teeth on the wheel 10 and that the discharge of material is thus effected at regular intervals and in certain quantities. The intervals between the charges of material deposited depend on the number of teeth with which the wheel 10 is provided as is obvious.

In addition to the advantages previously described the structure disclosed has the further advantage that the hopper and its operating connections may be self-contained and hence removable and replaceable (relatively to the uprights 8) as a unit. The construction disclosed also has the advantage that its parts are readily accessible for the purpose of renewal or repairs.

A guide-strap 20 is formed with a slot 21 through which passes a headed bolt 22 which is held in any adjustment in the slot by a wing or thumb nut 22. This strap serves to guide the knocker arm 20 and the head of the bolt serves to limit the stroke of the arm as it lies in the path of movement of the arm; and the stroke of the arm will be regulated by adjustment of the headed bolt which will be held to its adjustment by the thumb nut.

Having fully described my invention, I claim:

1. A fertilizer distributer including a ground wheel, a tiltable hopper operative by impact to discharge its contents, a spur wheel rotating with the ground wheel, an arm carried by the hopper for engagement with the spur wheel, a spring to return the hopper to normal position after each operation thereof by the spur wheel, means to suddenly arrest the return movement of the hopper and to develop a shock by virtue of which material is discharged from the hopper, and means for adjusting the position of said arm relatively to the spur wheel and thereby varying the throw of the hopper.

2. A fertilizer distributer including a ground wheel, a tiltable hopper operative by impact to discharge its contents, a spur wheel rotating with the ground wheel, an arm pivoted on the hopper for engagement with the spur wheel, a spring to return the hopper to normal position after each operation thereof by the spur wheel, means to suddenly arrest the return movement of the hopper and to develop a shock by virtue of which material is discharged from the hopper, a handle pivotally mounted at the upper end of the arm and a slotted bracket carried by the hopper and through which the handle projects, the handle having rack teeth which normally engage a wall of the slot of said bracket and lock the arm against movement on its pivot.

3. A fertilizer distributer including a ground wheel, a hopper having tiltable movement whereby it is operative to discharge its contents, a spur wheel rotating with the ground wheel, an arm pivotally connected to the hopper for engagement with the spur wheel, a handle pivotally mounted at the upper end of the arm and a slotted bracket carried by the hopper and through which the handle projects, the handle having rack teeth which normally engage a wall of the slot of said bracket and lock the arm against movement on its pivot.

4. A fertilizer distributer including a ground wheel, a hopper from which material is periodically discharged during the rotation of the ground wheel, an arm controlling the discharge of material from the hopper, a spur wheel for engagement with the arm, the arm being pivotally mounted, a handle pivotally mounted at the upper end of the arm and a slotted bracket through which the handle projects, the handle having rack teeth which normally engage a wall of the slot of said bracket and lock the arm against movement on its pivot.

In testimony whereof I affix my signature in presence of two witnesses.

SIMEON R. SIKES.

Witnesses:
E. E. LUKE,
L. R. TUCKER.